United States Patent
Chung et al.

(10) Patent No.: US 8,477,276 B2
(45) Date of Patent: Jul. 2, 2013

(54) THIN FILM TRANSISTOR ARRAY SUBSTRATE, METHOD OF MANUFACTURING THE SAME, AND LIQUID CRYSTAL DISPLAY DEVICE

(75) Inventors: Te-Chen Chung, Kunshan (CN); Liufei Zhou, Kunshan (CN); Yanbing Qiao, Kunshan (CN); Xia Huang, Kunshan (CN); Chia-Te Liao, Kunshan (CN)

(73) Assignee: Infovision Optoelectronics (Kunshan) Co. Ltd., Kunshan (CN)

( * ) Notice: Subject to any disclaimer, the term of this patent is extended or adjusted under 35 U.S.C. 154(b) by 354 days.

(21) Appl. No.: 12/917,987

(22) Filed: Nov. 2, 2010

(65) Prior Publication Data

US 2011/0261277 A1 Oct. 27, 2011

(30) Foreign Application Priority Data

Apr. 23, 2010 (CN) .......................... 2010 1 0154415

(51) Int. Cl.
*G02F 1/1337* (2006.01)
(52) U.S. Cl.
USPC .......................................... 349/129; 349/130
(58) Field of Classification Search
USPC ................... 349/129, 130, 43, 139, 144–146
See application file for complete search history.

(56) References Cited

U.S. PATENT DOCUMENTS

| | | | |
|---|---|---|---|
| 5,825,449 A * | 10/1998 | Shin | 349/148 |
| 6,256,080 B1 * | 7/2001 | Colgan et al. | 349/129 |
| 6,313,899 B1 * | 11/2001 | Wu et al. | 349/130 |
| 6,724,452 B1 * | 4/2004 | Takeda et al. | 349/139 |
| 2006/0238687 A1 * | 10/2006 | Su | 349/129 |
| 2006/0250562 A1 * | 11/2006 | Wu et al. | 349/143 |

* cited by examiner

*Primary Examiner* — Edward Glick
*Assistant Examiner* — David Chung
(74) *Attorney, Agent, or Firm* — Sand & Sebolt

(57) ABSTRACT

A thin film transistor array substrate comprises a transparent substrate, and scanning lines, data lines and pixel regions that are formed on the transparent substrate. Each pixel region comprises a pixel electrode, a thin film transistor for controlling the pixel electrode, a first push alignment electrode and a second push alignment electrode. Projections of the first and second push alignment electrodes on the transparent substrate are located on two opposite sides of the pixel electrode. The pixel electrode is covered with an insulation layer and the insulation layer is provided with a pull alignment opening. When the thin film transistor array substrate is in operation, an oblique pull electric field is formed at the pull alignment opening, and transverse push electric fields are formed between the first push alignment electrode and the pixel electrode as well as between the second push alignment electrode and the pixel electrode, respectively.

16 Claims, 10 Drawing Sheets

THIN FILM TRANSISTOR ARRAY SUBSTRATE, METHOD OF MANUFACTURING THE SAME, AND LIQUID CRYSTAL DISPLAY DEVICE

CROSS-REFERENCE TO RELATED APPLICATION

This application claims priority of and incorporates by reference Chinese Patent Application No. 201010154415.6 filed Apr. 23, 2010.

FIELD OF THE INVENTION

The present invention relates to field of liquid crystal display, in particular to a thin film transistor array substrate and a method of manufacturing the same, as well as a liquid crystal display device having the same.

BACKGROUND

A thin film transistor liquid crystal display (TFT-LCD) has the characteristics of being light, thin and small. Besides, it has the advantages of low power consumption, radiative-free and relatively lower cost of manufacture. These characteristics and advantages make the TFT-LCD play a leading role in the flat panel display field. The TFT-LCD is highly adapted to be applied to a desktop computer, a palmtop computer, a personal digital assistant (PDA), a portable phone, a TV set and various office automation devices and audio-visual devices.

A liquid crystal display panel is a main component of a liquid crystal display. With the appearance of large-sized liquid crystal display, in order to solve the problem with wide viewing angle (i.e., when a user views the image right in front of the screen and obliquely in front of the screen, the brightness of the images are different. In general, the brightness of the image seen right in front of the screen is bigger than that seen obliquely in front of the screen), a multi-domain vertical alignment (MVA) type liquid crystal display panel has been developed, which employs a negative polarity liquid crystal material having a negative dielectric anisotropy, that is, when the liquid crystal display panel is not powered, the liquid crystal molecule is arrayed in perpendicular to the liquid crystal display panel.

With reference to FIGS. 1 and 2, FIG. 1 is a schematic view of a pixel structure of a conventional MVA type LCD panel, in which color filter substrate is omitted for purpose of clarity; and FIG. 2 is a sectional view along A-A line in FIG. 1. As shown in FIG. 2, the LCD panel comprises a lower layer of thin film transistor array substrate (also referred to as TFT array substrate) 1, an upper layer of color filter substrate (also referred to as CF substrate) 2, and a liquid crystal layer 3 which is sandwiched between the TFT array substrate 1 and the CF substrate 2 and is composed of a plurality of liquid crystal molecules. As shown in FIG. 1, the TFT array substrate 1 comprises a plurality of scanning lines 10, a plurality of data lines 11 and a plurality of pixel regions 12 defined by the plurality of scanning lines 10 and the plurality of data lines 11 that are intersected with and perpendicular to each other. FIG. 1 shows only one of the pixel regions 12. The pixel region 12 is formed with a pixel electrode 14 which is divided into two subpixel electrodes 141, 142 with a slit 18 formed therebetween. A first and a second thin film transistors 15, 16 are formed near the position where the scanning lines 10 intersect with the data lines 11 for controlling the two subpixel electrodes 141, 142 respectively. The first and the second thin film transistor 15, 16 each comprises a gate electrode G, a source electrode S and a drain electrode D. The gate electrodes G of the first and the second thin film transistors 15, 16 are electrically connected to different scanning lines 10 respectively, the source electrodes S are electrically connected to the same data line 11, and the drain electrodes D are electrically connected to the two subpixel electrodes 141, 142 respectively. As shown in FIG. 2, a black matrix (BM) 22, a color filter layer 23 and a common electrode 24 that covers the black matrix 22 and the color filter layer 23 are sequentially formed on the CF substrate 2. Besides, the CF substrate 2 further comprises a bump 28 provided on the common electrode at a location corresponding to the two subpixel electrodes 141, 142. Due to the existence of the bump 28, liquid crystal molecules tend to tilt perpendicular to the surface on which the bump 28 is located when a voltage is not applied, i.e., the liquid crystal molecules have a pretilt angle that inclines towards different directions. Therefore, the inclination direction of liquid crystal molecules after the liquid crystal display panel is powered can be controlled effectively and rapidly, thereby improving responding speed of liquid crystal molecules, and when the liquid crystal display panel is in normal operation, the liquid crystal layer 3 can be divided into a plurality of tiny areas having different inclination directions so as to improve a wide viewing angle characteristic of the liquid crystal display panel.

However, such the liquid crystal display panel requires that liquid crystal molecules have a pretilt angle when not powered so as to improve the responding speed of liquid crystal molecules. In order to form the pretilt angle, a masking process is additionally needed to form the bump 28 on the CF substrate 2. Besides, the bump 28 is typically made from a transparent material in order not to improve aperture ratio of the liquid crystal display panel. However, the existence of the bump 28 will generally result in light leakage when the liquid crystal display panel is in a dark state, thereby decreasing contrast ratio of the liquid crystal display panel.

SUMMARY OF THE INVENTION

In view of the above problems in the prior art, the present invention proposes a thin film transistor array substrate and a method of manufacturing the same, as well as a liquid crystal display device to which the thin film transistor array substrate is applied.

In an aspect of the invention, a thin film transistor array substrate is provided, comprising a transparent substrate, and a plurality of scanning lines, a plurality of data lines and a plurality of pixel regions that are formed on the transparent substrate. Each pixel region is formed by two adjacent scanning lines and two adjacent data lines that intersect with each other, and comprises a pixel electrode and a thin film transistor for controlling the pixel electrode. The pixel electrode is covered with an insulation layer which is provided with pull alignment openings, and each pixel region further comprises a first push alignment electrode and a second push alignment electrode, wherein projections of the first and the second push alignment electrodes on the transparent substrate are respectively located at two opposite sides of the pixel electrode. When the thin film transistor array substrate is in operation, an oblique pull electric field is formed at the pull alignment openings, and transverse push electric fields are formed between the first push alignment electrode and the pixel electrode as well as between the second push alignment electrode and the pixel electrode, respectively.

In another aspect of the invention, a liquid crystal display device is provided, comprising a liquid crystal display panel and a drive circuit connected with the liquid crystal display panel. The liquid crystal display panel comprises the above-described thin film transistor array substrate, a color filter substrate having a common electrode and a liquid crystal layer sandwiched between the two substrates.

In yet another aspect of the invention, a method of manufacturing a thin film transistor array substrate is provided, comprising: forming a first metal layer on a transparent substrate and patterning the first metal layer so as to form gate electrodes of thin film transistors, scanning lines, main body portions of common electrode lines and first push alignment electrodes and second push alignment electrodes constituted by two extending portions of the common electrode lines;

forming a gate electrode insulation layer and patterning the gate electrode insulation layer so as to form through apertures in a non-display area;

forming an amorphous silicon layer and a doped amorphous silicon layer sequentially, and patterning the amorphous silicon layer and the doped amorphous silicon layer so as to form semiconductor layers of the thin film transistors;

forming a second metal layer and patterning the second metal layer so as to form source electrodes and drain electrodes of the thin film transistors and data lines;

forming a transparent conductive material layer and patterning the transparent conductive material layer so as to form pixel electrodes, each pixel electrode and the drain electrode of the corresponding thin film transistor being electrically connected directly;

depositing a passivation layer and patterning the passivation layer so as to form pull alignment openings on the passivation layer covering the pixel electrodes so that portions of the pixel electrodes are exposed.

In still another aspect of the invention, a method of manufacturing a thin film transistor array substrate is provided, comprising:

forming a first metal layer on a transparent substrate and patterning the first metal layer so as to form gate electrodes of thin film transistors, scanning lines, main body portions of common electrode lines and first push alignment electrodes and second push alignment electrodes constituted by two extending portions of the common electrode lines;

forming a transparent conductive material layer and patterning the transparent conductive material layer so as to form pixel electrodes;

forming a gate electrode insulation layer and patterning the gate electrode insulation layer so as to form first portions of pull alignment openings on the gate electrode insulation layer covering the pixel electrodes so that portions of the pixel electrodes are exposed, and forming through holes in the pixel regions and through apertures in the non-display area;

forming an amorphous silicon layer and a doped amorphous silicon layer sequentially, and patterning the amorphous silicon layer and the doped amorphous silicon layer so as to form semiconductor layers of the thin film transistors;

forming a second metal layer and patterning the second metal layer so as to form source electrodes and drain electrodes of the thin film transistors and data lines, the drain electrodes of the thin film transistor being electrically connected with the pixel electrodes via the through holes;

depositing a passivation layer and patterning the passivation layer so as to form a second portions of pull alignment openings at locations corresponding to the first portions of the pull alignment openings on the passivation layer covering the pixel electrodes so that portions of the pixel electrodes are exposed.

In further still another aspect of the invention, a method of manufacturing a thin film transistor array substrate is provided, comprising:

forming a first metal layer on a transparent substrate and patterning the first metal layer so as to form gate electrodes of thin film transistors, scanning lines, main body portions of common electrode lines and first push alignment electrodes and second push alignment electrodes constituted by two extending portions of the common electrode lines;

forming a gate electrode insulation layer, an amorphous silicon layer and a doped amorphous silicon layer sequentially, and patterning the amorphous silicon layer and the doped amorphous silicon layer so as to form semiconductor layers of the thin film transistors;

forming a second metal layer and patterning the second metal layer so as to form source electrodes and drain electrodes of the thin film transistors and data lines;

depositing a first passivation layer and patterning the first passivation layer so as to form through holes;

forming a transparent conductive material layer and patterning the transparent conductive material layer so as to form pixel electrodes, each pixel electrode being electrically connected with the drain electrode of the corresponding thin film transistor via the through hole;

depositing a second passivation layer and patterning the second passivation layer so as to form pull alignment openings on the second passivation layer covering the pixel electrodes so that portions of the pixel electrodes are exposed.

With the thin film transistor array substrate of the invention and a liquid crystal display device having the thin film transistor array substrate, since a pull alignment opening and a first and a second push alignment electrodes are provided in the pixel structure, an oblique pull electric field can be formed at the pull alignment opening and transverse push electric fields can be formed between the first push alignment electrode and the pixel electrode as well as between the second push alignment electrode and the pixel electrode respectively when the thin film transistor array substrate is in operation. The oblique pull electric field and the transverse push electric field make causes that liquid crystal molecules tilt towards a predetermined direction, thereby improving the responding speed of liquid crystal molecules. Besides, the liquid crystal display device has a higher contrast ratio.

DETAILED DESCRIPTION OF EMBODIMENTS

For a better understanding of the objectives, technical solutions and advantages of the invention, the invention will be explained in further detail with reference to the drawings and in conjunction with particular embodiments.

A liquid crystal display device according to an embodiment of the invention comprises a liquid crystal display panel and a driving circuit (not shown) connected with the liquid crystal display panel.

First Embodiment

Figure 1:
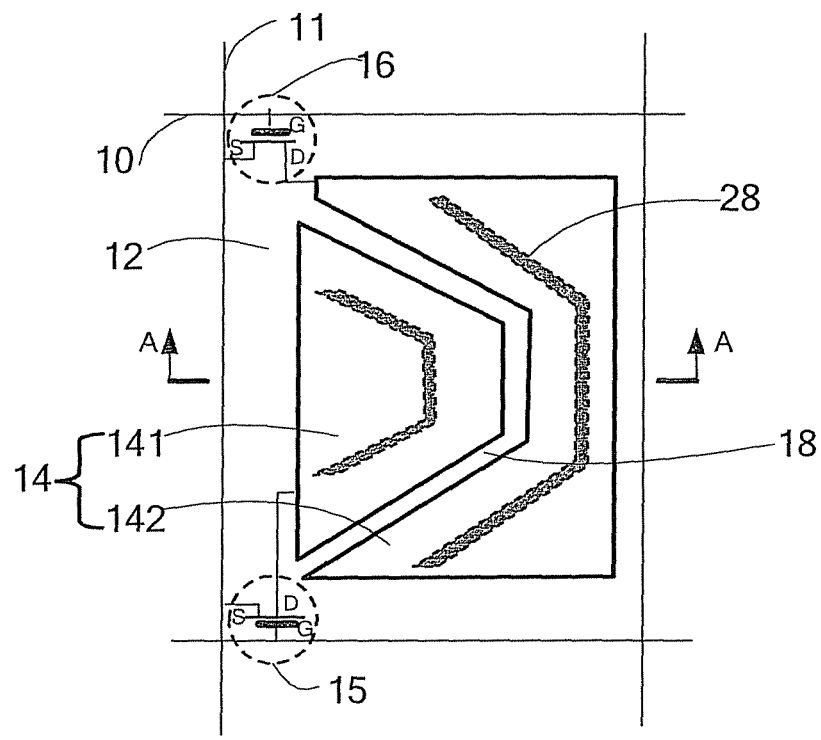
FIG. 1 is a schematic view of a pixel structure of a conventional MVA type liquid crystal display panel.
Figure 2:
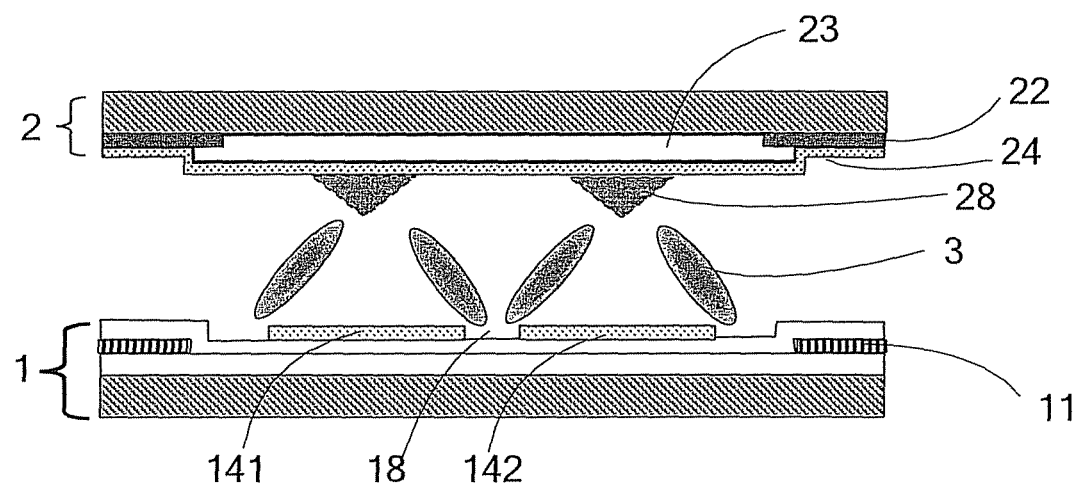
FIG. 2 is a sectional view taken along line A-A in FIG. 1.
Figure 3:
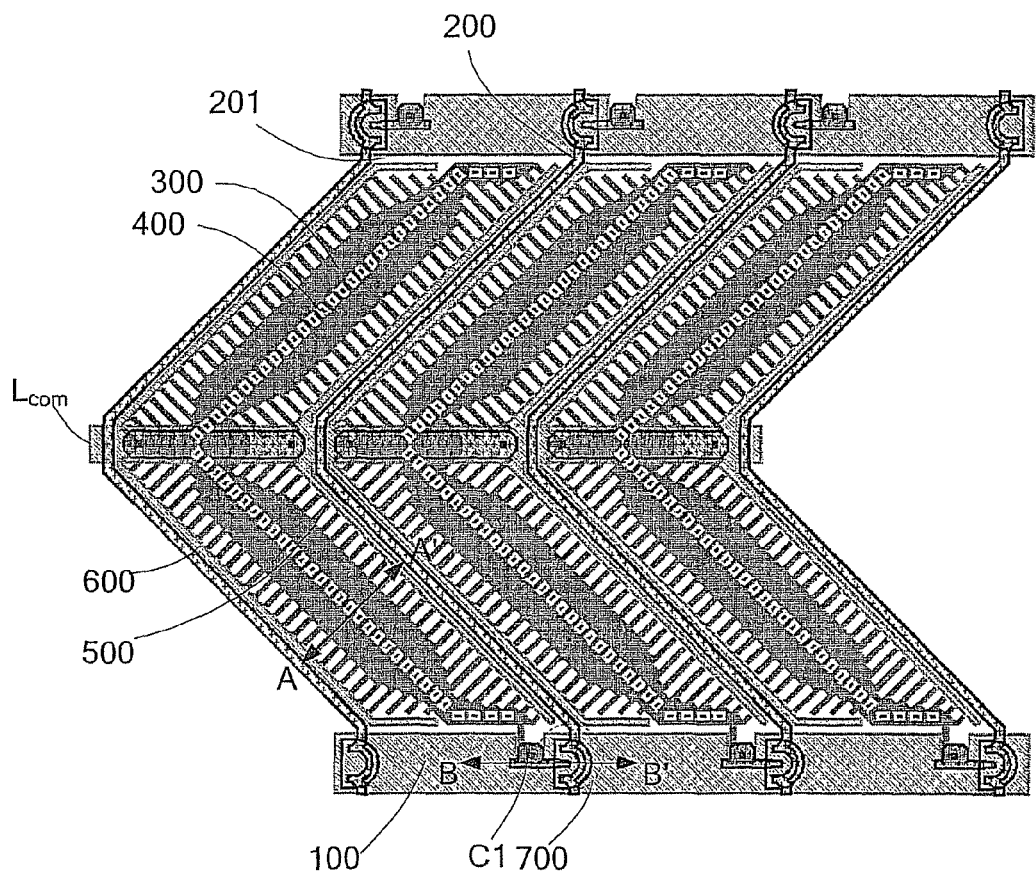
FIG. 3 is a structural plan view of a portion of the liquid crystal display panel according to a first embodiment of the invention.

FIG. 3 is a structural plan view of a portion of the liquid crystal display panel according to a first embodiment of the invention. For purpose of clarity, only the thin film transistor array substrate in the liquid crystal display panel is shown and color filter substrate therein is omitted. As shown in FIG. 3, in the first embodiment, the common electrode line $L_{com}$ of the thin film transistor array substrate comprises a main body portion in parallel with scanning lines 100 and a plurality of extending portions extending in a direction substantially parallel with the edge of pixel electrode 300, and the extending portions of the common electrode line $L_{com}$ are located respectively at two opposite sides of the pixel electrode 300 of each pixel region 201. The two extending portions of the common electrode line $L_{com}$ in each pixel region form a first push alignment electrode 500 and a second push alignment electrode 600.

The thin film transistor array substrate in the first embodiment of the invention as shown in FIG. 3 may have three different structures and corresponding manufacturing methods in accordance with different positions where the pixel electrodes are formed. These three situations will be explained in detail hereinafter with reference to the drawings.

The First Variation of the First Embodiment

Figure 4:
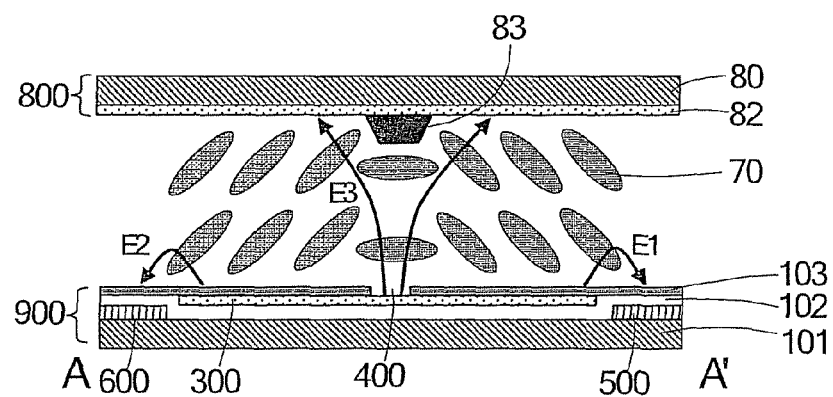
FIG. 4 is a sectional view of the liquid crystal display panel taken along line A-A' in FIG. 3, showing clearly a sectional structure of a thin film transistor array substrate according to a first variation of the first embodiment.

FIG. 4 is a sectional view of the liquid crystal display panel taken along line A-A' in FIG. 3, showing clearly a sectional structure of a thin film transistor array substrate according to a first variation of the first embodiment. As shown in FIG. 4 and in combination with FIG. 3, the liquid crystal display panel comprises a thin film transistor array substrate 900, a color filter substrate 800 and a liquid crystal layer 70 sandwiched between the two substrates 900, 800, a common electrode 82 being provided on the color filter substrate 800.

The thin film transistor array substrate 900 comprises a transparent substrate 101 and a plurality of scanning lines 100 formed on the transparent substrate 101, a plurality of data lines 200 intersecting with the plurality of scanning lines 100, and a plurality of pixel regions 201 defined by the plurality of scanning lines 100 and the plurality of data lines 200.

Each pixel region 201 is formed by two adjacent scanning lines 100 and two adjacent data lines 200 intersecting with each other, and comprises a pixel electrode 300, a thin film transistor 700, and a first push alignment electrode 500 and a second push alignment electrode 600 formed by the two extending portions of the common electrode line $L_{com}$. The gate electrode of the thin film transistor 700 is electrically connected with the scanning line 100, the source line thereof is electrically connected with the data line 200, and the drain electrode thereof is electrically connected with the pixel electrode 300 via a through hole C1. The projections of the first push alignment electrode 500 and the second push alignment electrode 600 on the transparent substrate 101 are located at two opposite sides of the pixel electrode 300. The first push alignment electrode 500 and the second push alignment electrode 600 both extend along the edge of the pixel electrode 300. The pixel electrode 300 is covered with an insulation layer, which in this embodiment is a passivation layer 103. There is a gate electrode insulation layer 102 under the layer on which the pixel electrode 300 is located. A pull alignment opening 400 is provided on the passivation layer 103 for exposing a portion of the pixel electrode 300. Preferably, a plurality of pull alignment openings 400 are provided on the passivation layer 103. The plurality of pull alignment openings 400 are arranged in a bar shape and the projections thereof on the transparent substrate 101 are located at a central position of the pixel electrode 300 so as to expose the central position of the pixel electrode 300. Besides, the bar shape formed by the plurality of pull alignment openings 400 is parallel with the first push alignment electrode 500 and the second push alignment electrode 600.

Figure 5:
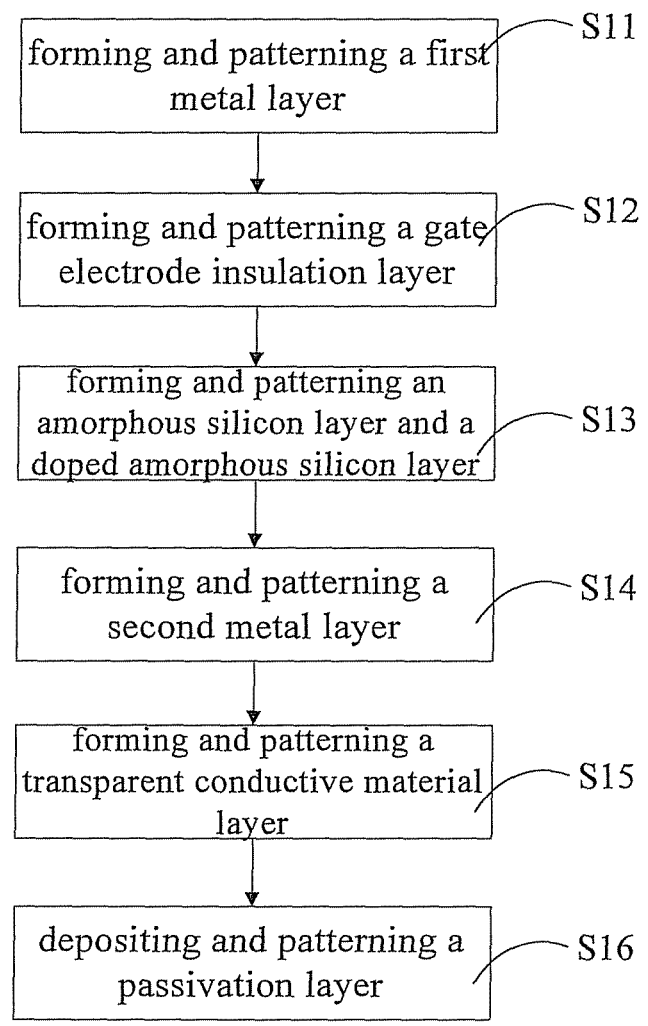
FIG. 5 is a flowchart showing a method of manufacturing the thin film transistor array substrate according to the first variation of the first embodiment as shown in FIG. 4.

In this embodiment, six masking processes can be performed in a method of manufacturing the thin film transistor array substrate 900. As shown in FIG. 5 and in combination with FIGS. 6(a)-6(f), the method of manufacturing the thin film transistor array substrate 900 in this embodiment will be described in detail.

Figure 6:
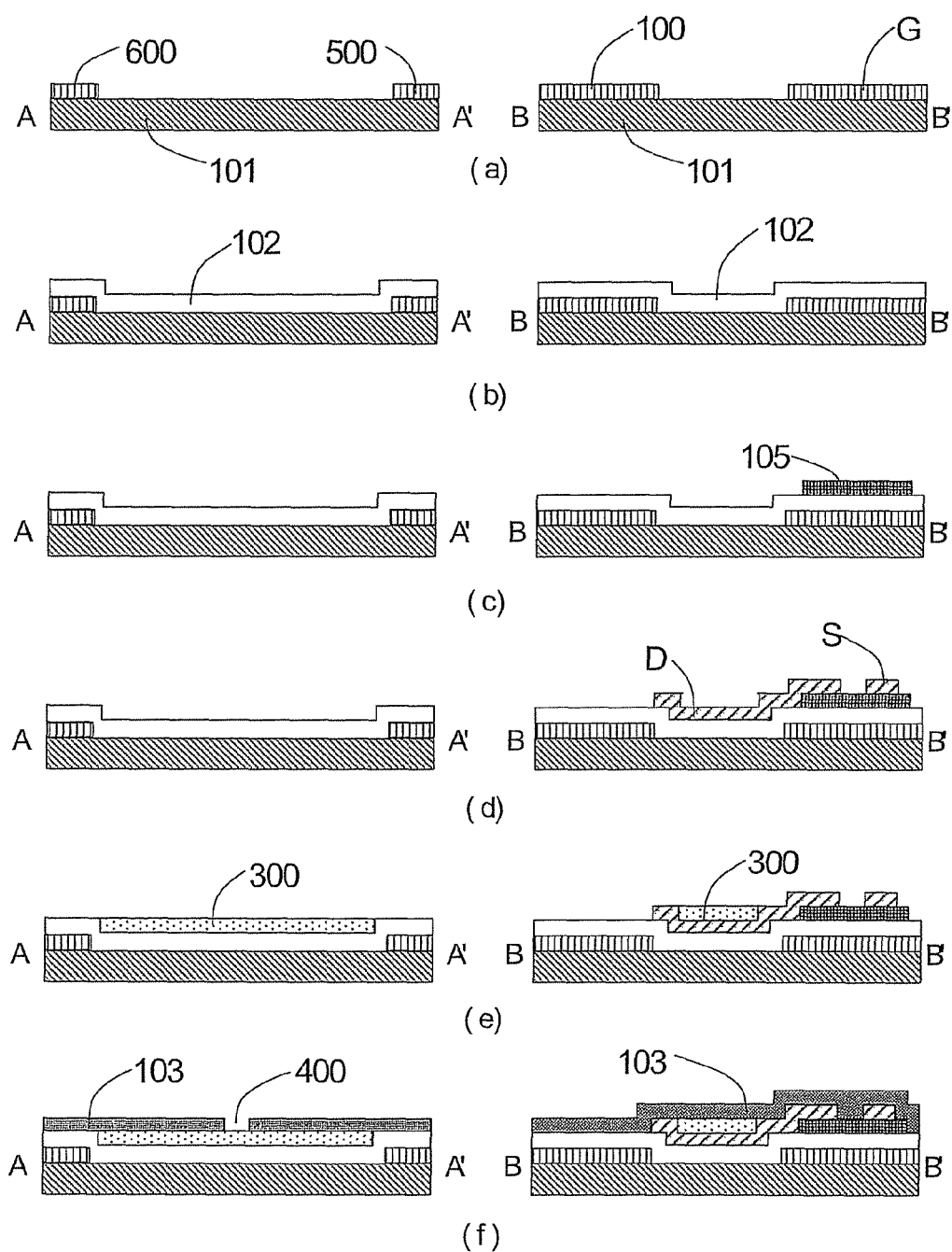
FIGS. 6(a)-6(f) are sectional views showing the process of manufacturing the thin film transistor array substrate according to the first variation of the first embodiment as shown in FIG. 4, respectively illustrating partial sectional structures taken along lines A-A' and B-B' in FIG. 4.

At step S11 (as shown in FIG. 6(a)), a first metal layer is formed on the transparent substrate 101 and is patterned to form a gate electrode G of the thin film transistor 700, the scanning lines 100, the main body of the common electrode line $L_{com}$ and the first push alignment electrode 500 and the second push alignment electrode 600 constituted by two extending portions of the common electrode line $L_{com}$.

At step S12 (as shown in FIG. 6(b)), a gate electrode insulation layer 102 is formed on the patterned first metal layer and a portion of the transparent substrate 101, and the gate electrode insulation layer 102 is patterned so as to form a through aperture (not shown) in the non-display area, via which a detecting circuit subsequently formed on the non-display area of the thin film transistor array substrate 900 can be electrically connected with the first metal layer.

At step S13 (as shown in FIG. 6(c)), an amorphous silicon layer and a doped amorphous silicon layer are sequentially formed on the gate electrode insulation layer 102 and are patterned so as to form a semiconductor layer 105 of the thin film transistor 700.

At step S14 (as shown in FIG. 6(d)), a second metal layer is formed on the gate electrode insulation layer 102 and the semiconductor layer 105 of the thin film transistor 700 and is patterned so as to form a source electrode S and a drain electrode D of the thin film transistor 700 and data lines 200.

At step S15 (as shown in FIG. 6(e)), a transparent conductive material layer (typically the ITO layer) is formed on the patterned second metal layer and is patterned so as to form the pixel electrode 300, the pixel electrode 300 being directly electrically connected with the drain electrode D of the thin film transistor 700.

At step S16 (as shown in FIG. 6(f)), a passivation layer 103 is deposited on a portion of the gate electrode insulation layer 102, a portion of the patterned second metal layer and the pixel electrode 300 and is patterned so as to form the pull alignment hole.400 on the passivation layer 103 covering the pixel electrode 300 so that a portion of the pixel electrode 300 is exposed.

Through the above steps S11-S16, the thin film transistor array substrate 900 of the first variation of the first embodiment is formed.

The Second Variation of the First Embodiment

Discussion is not made where the second variation of the first embodiment is the same as the first variation of the first embodiment. The main difference of the second variation of the first embodiment from the first variation of the first embodiment lies in that the pixel electrode 300 is formed at a different location so that the manufacturing method and structure of the thin film transistor array substrate 900 is slightly different from that of the first variation of the first embodiment. Description is made below only with respect to the differences.

Figure 7:
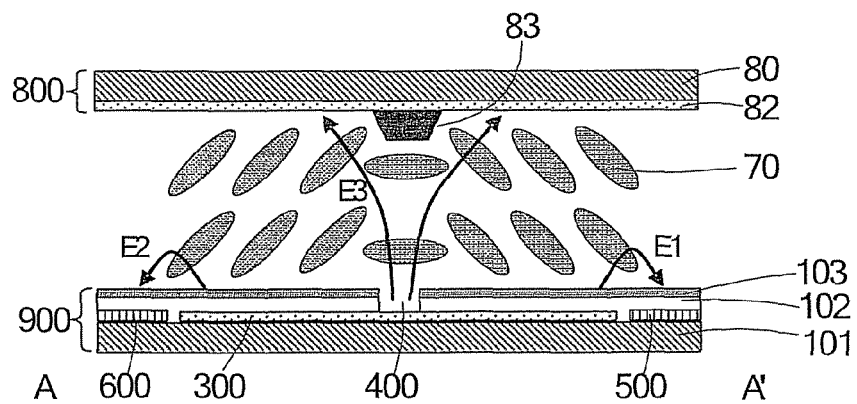
FIG. 7 is a sectional view of the liquid crystal display panel taken along line A-A' in FIG. 3, showing clearly a sectional structure of a thin film transistor array substrate according to a second variation of the first embodiment.

FIG. 7 is a sectional view of the liquid crystal display panel taken along line A-A' in FIG. 3, showing clearly a sectional structure of a thin film transistor array substrate according to the second variation of the first embodiment. The pixel electrode 300 is covered with an insulation layer. As shown in FIG. 7, in this embodiment, the insulation layer is the gate electrode insulation layer 102 and the passivation layer 103. A pull alignment opening 400 is formed together on the gate electrode insulation layer 102 and the passivation layer 103 for exposing a portion of the pixel electrode 300. Preferably, a plurality of pull alignment openings 400 are formed together on the gate electrode insulation layer 102 and the passivation layer 103. The plurality of pull alignment openings 400 are arranged in a bar shape and the projections thereof on the transparent substrate 101 are located at the central position of the pixel electrode 300 so as to expose the central position of the pixel electrode 300. Besides, the bar shape formed by the plurality of pull alignment openings 400 is parallel with the first push alignment electrode 500 and the second push alignment electrode 600.

Figure 8:
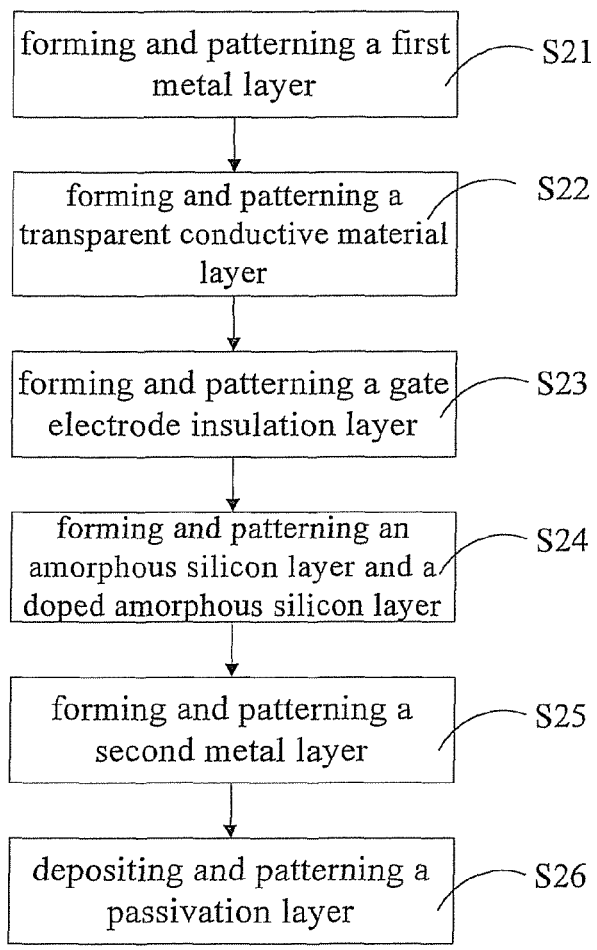
FIG. 8 is a flowchart showing a method of manufacturing the thin film transistor array substrate according to the second variation of the first embodiment as shown in FIG. 7.

In this embodiment, still, six masking processes can be performed in the method of manufacturing the thin film transistor array substrate 900. As shown in FIG. 8 and in combination with FIGS. 9(a)-9(f), the method of manufacturing the thin film transistor array substrate 900 in the embodiment will be described in detail.

Figure 9:
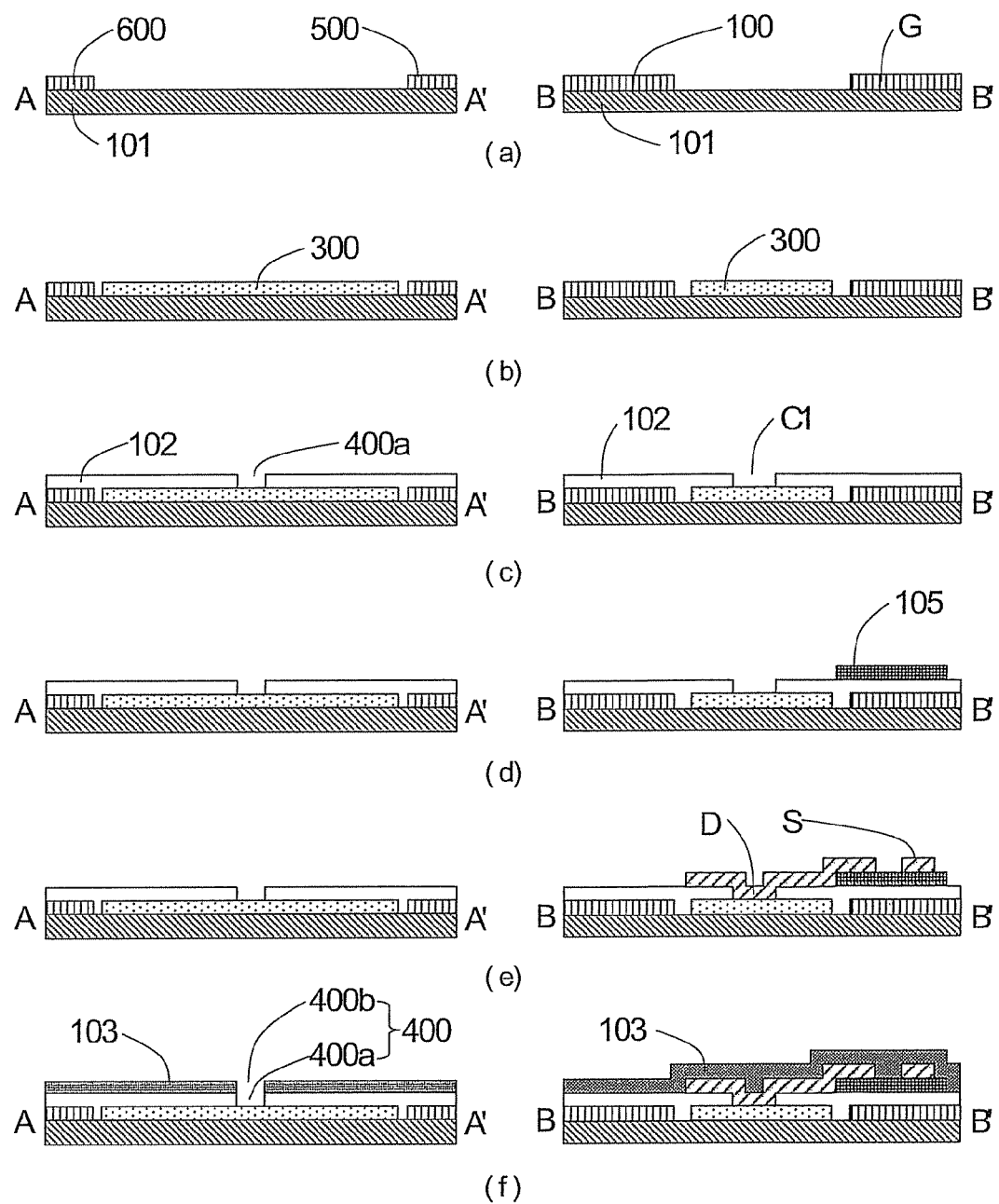
FIGS. 9(a)-9(f) are sectional views showing the process of manufacturing the thin film transistor array substrate according to the second variation of the first embodiment as shown in FIG. 7, respectively illustrating partial sectional structures taken along lines A-A' and B-B' in FIG. 7.

At step S21 (as shown in FIG. 9(a)), a first metal layer is formed on the transparent substrate 101 and is patterned to form a gate electrode G of the thin film transistor 700, the scanning lines 100, the main body of the common electrode line $L_{com}$ and the first push alignment electrode 500 and the second push alignment electrode 600 constituted by two extending portions of the common electrode line $L_{com}$.

At step S22 (as shown in FIG. 9(b)), a transparent conductive material layer is formed on the patterned first metal layer and a portion of the transparent substrate 101 and is patterned so as to form the pixel electrode 300.

At step S23 (as shown in FIG. 9(c)), a gate electrode insulation layer 102 is formed on a portion of the transparent substrate 101, a portion of the patterned first metal layer and the pixel electrode 300 and is patterned so as to formed a first portion 400a of the pull alignment opening 400 on the gate electrode insulation layer 102 covering the pixel electrode 300 so that a portion of the pixel electrode 300 is exposed, and a through hole C1 in the pixel region 201 and a through aperture (not shown) in the non-display area are formed. Via the through aperture, the first metal layer on the thin film transistor array substrate 900 can be electrically connected with a second metal layer, or with the transparent conductive material.

At step S24 (as shown in FIG. 9(d)), an amorphous silicon layer and a doped amorphous silicon layer are sequentially formed and patterned so as to form a semiconductor layer 105 of the thin film transistor 700.

At step S25 (as shown in FIG. 9(e)), a second metal layer is formed on the pixel electrode 300, a portion of the gate electrode insulation layer 102 and the semiconductor layer 105 and is patterned so as to form a source electrode S and a drain electrode D of the thin film transistor 700 and data lines 200, the drain electrode D of the thin film transistor 700 being electrically connected with the pixel electrode 300 via the through hole C1 formed at the step S23.

At step S26 (as shown in FIG. 9(f)), a passivation layer 103 is deposited on a portion of the gate electrode insulation layer 102, the patterned second metal layer and the semiconductor layer 105 and is patterned so as to form a second portion 400b of the pull alignment opening 400 at a location corresponding to the first portion of the pull alignment opening 400 on the passivation layer 103 covering the pixel electrode 300 so that a portion of the pixel electrode 300 is finally exposed via the pull alignment opening 400 formed by the first portion 400a and the second portion 400b.

Through the above steps S21-S26, the thin film transistor array substrate 900 of the second variation of the first embodiment is formed.

In addition, in this manufacturing method, the process of patterning the pull alignment opening 400 preferably includes digging holes in the same process on the passivation layer 103 and the gate electrode insulation layer 102 below the passivation layer 103 at the location where the pull alignment opening 400 is formed so as to form the pull alignment opening 400 so that a portion of the pixel electrode under the pull alignment opening 400 is exposed.

The Third Variation of the First Embodiment

Discussion is not made where the third variation of the first embodiment is the same as the first and the second variations of the first embodiment. The main difference of the third variation of the first embodiment from the first and the second variations of the first embodiment lies in that the pixel electrode 300 is formed at a different location so that the manufacturing method and structure of the thin film transistor array substrate 900 is slightly different from those of the first and second variations of the first embodiment. Description is made below only with respect to the differences.

Figure 10:
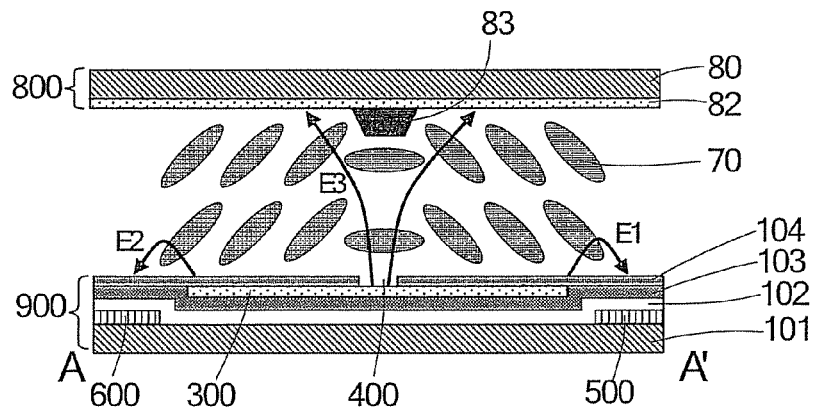
FIG. 10 is a sectional view of the liquid crystal display panel taken along line A-A' in FIG. 3, showing clearly a sectional structure of a thin film transistor array substrate according to a third variation of the first embodiment.

FIG. 10 is a sectional view of the liquid crystal display panel taken along line A-A' in FIG. 3, showing clearly a sectional pixel structure of a thin film transistor array substrate according to the third variation of the first embodiment. The pixel electrode 300 is covered with an insulation layer. As shown in FIG. 10, in this embodiment, the insulation layer is the passivation layer 104. A passivation layer 103 and a gate electrode insulation layer 102 are sequentially provided under the layer on which the pixel electrode 300 is located. A pull alignment opening 400 is provided on the passivation layer 104 for exposing a portion of the pixel electrode 300. Preferably, a plurality of pull alignment openings 400 are provided on the passivation layer 104. The plurality of pull alignment openings 400 are arranged in a bar shape and the projections thereof on the transparent substrate 101 are located at the central position of the pixel electrode 300 so as to expose the central position of the pixel electrode 300. Besides, the bar shape formed by the plurality of pull alignment openings 400 is parallel with the first push alignment electrode 500 and the second push alignment electrode 600.

Figure 11:
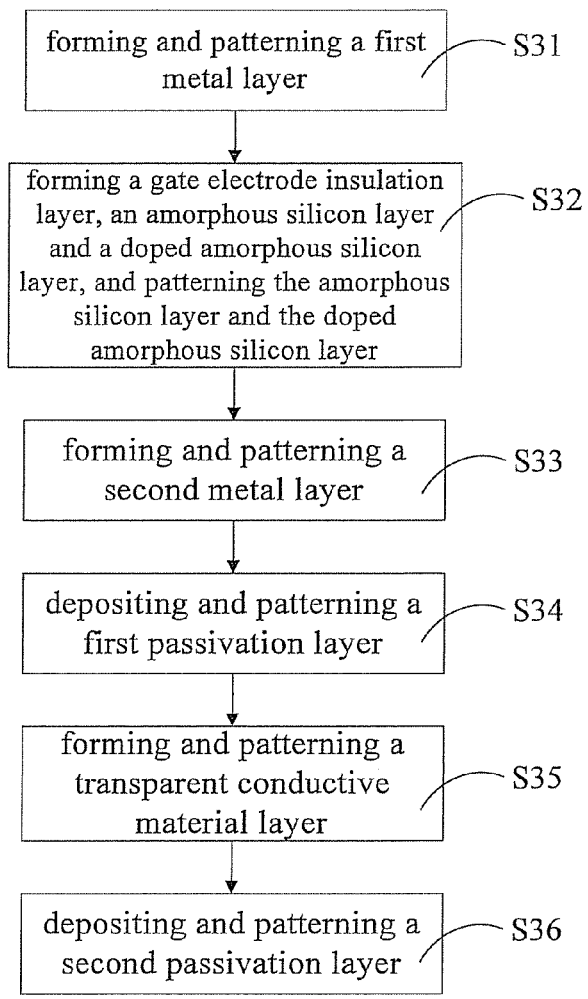
FIG. 11 is a flowchart showing a method of manufacturing the thin film transistor array substrate according to the third variation of the first embodiment as shown in FIG. 10.

While six masking processes are still performed, the method of manufacturing the thin film transistor array substrate 900 according to the third variation of the first embodiment is different from that of the first variation of the first embodiment. As shown in FIG. 11, the method of manufacturing the thin film transistor array substrate 900 according to the third variation of the first embodiment will be described in detail.

At step S31, a first metal layer is formed on the transparent substrate 101 and is patterned to form a gate electrode of the thin film transistor 700, the scanning lines 100, the main body of the common electrode line $L_{com}$ and the first push alignment electrode 500 and the second push alignment electrode 600 constituted by two extending portions of the common electrode line $L_{com}$.

At step S32, a gate electrode insulation layer 102, an amorphous silicon layer and a doped amorphous silicon layer are sequentially formed and the amorphous silicon layer and the doped amorphous silicon layer patterned so as to form a semiconductor layer 105 of the thin film transistor 700.

At step S33, a second metal layer is formed and patterned so as to form a source electrode and a drain electrode of the thin film transistor 700 and data lines 200.

At step S34, a first passivation layer 103 is deposited and patterned so as to form a through hole C1.

At step S35, a transparent conductive material layer is formed and patterned so as to form a pixel electrode 300 which is electrically connected with the drain electrode of the thin film transistor 700 via the above through hole C1.

At step S36, a second passivation layer 104 is deposited and patterned so as to form a push alignment opening 400 on the second passivation layer 104 covering the pixel electrode 300 so that a portion of the pixel electrode 300 is exposed.

Through the above steps S31-S36, the thin film transistor array substrate 900 of the third variation of the first embodiment is formed.

In the first embodiment (including the first, second and third variations of the first embodiment), when the liquid crystal display panel is in operation, the directions indicated by the arrows in FIGS. 4, 7 and 10 are substantially the electrical field directions in the pixel region of the liquid crystal display panel when powered. The electrical field directions in FIGS. 4, 7 and 10 are shown by an example in which the pixel electrode 300 has a positive polarity, i.e., the voltage across the pixel electrode 300 is larger than that across the common electrode 82 on the color filter substrate 800. The voltage across the common electrode 82 on the color filter substrate 800 is the same as that across the common electrode line $L_{com}$ on the thin film transistor array substrate 900, and there is a voltage difference between the pixel electrode 300 and the common electrode 82. Since both the first push alignment electrode 500 and the second push alignment electrode 600 are formed by two extending portions of the common electrode line $L_{com}$, the first push alignment electrode 500 and the second push alignment electrode 600 have the same voltage as that of the common electrode. Therefore, in the same pixel region, there is a voltage difference between the first push alignment electrode 500 and the pixel electrode 300 as well as between the second push alignment electrode 600 and the pixel electrode 300 respectively, which is equal to the voltage difference between the pixel electrode 300 and the common electrode 82. When the thin film transistor array substrate is in operation, since there is a voltage difference between the first push alignment electrode 500 and the pixel electrode 300 as well as between the second push alignment electrode 600 and the pixel electrode 300 respectively, the first push alignment electrode 500 and the second push alignment electrode 600 at two sides of the pixel electrode form transverse push electrical fields E1, E2 with the pixel electrode 300 respectively, and the longer axes of liquid crystal molecules in the liquid crystal display panel tend to be arranged in perpendicular to electrical field lines when powered. Therefore, under the action of the transverse push electrical fields E1, E2, liquid crystal molecules in the liquid crystal layer 70 at two sides of the pixel electrode 30 will tilt by a certain angle under the action of push electric field in the direction from the edge of pixel region to the interior of pixel region. It equals to that liquid crystal molecules on the left side of the first push alignment electrode 500 are under the push action of the first push alignment electrode 500, and liquid crystal molecules on the right side of the second push alignment electrode 600 are under the push action of the second push alignment electrode 600. Meanwhile, when the thin film transistor array substrate 900 is in operation, since there is a voltage difference between the pixel electrode 300 and the common electrode 82, an electrical field is formed between the pixel electrode 300 and the common electrode 82. Due to the existence of the pull alignment opening 400, the lines of the electrical field formed between the pixel electrode 300 and the common electrode 82 will incline towards two opposite sides from the pull alignment opening 400 respectively. Therefore, an oblique pull electrical field E3 is formed at the pull alignment opening 400, under the action of which liquid crystal molecules on the left and right sides of the pull alignment opening 400 will tilt by a certain angle. It equals to that crystal molecules on the life and right sides of the pull alignment opening 400 are under the pull action of the pull alignment opening 400, and the transverse push electrical fields E1, E2 and the oblique pull electrical field E3 cause crystal molecules to till towards the same direction. Under double actions of the transverse push electrical fields E1, E2 and the oblique pull electrical field E3, liquid crystal molecules are tilted by a certain angle in a predetermined direction. Therefore, the responding speed of liquid crystal molecules can be increased and the responding speed of liquid crystal display panel can be thereby increased. In addition, the plurality of pull alignment openings 400 in the embodiment are arranged in a bar shape and the projections thereof on the transparent substrate 101 are located at the central position of the pixel electrode 300. Besides, the bar shape formed by the plurality of pull alignment openings 400 is parallel with the first push alignment electrode 500 and the second push alignment electrode 600. Therefore, when the thin film transistor array substrate 900 is in operation, the pull electrical fields on the left and right sides of the pull alignment opening 400 in the pixel region can be evenly symmetrical with each other, making the crystal molecules on the left and right sides of the pull alignment opening 400 under pull actions of the pull alignment opening 400 that are symmetrical with each other in a left-to-right direction and viewing angles for displaying images of the entire liquid crystal display symmetrical with each other in a left-to-right direction.

The transverse push electrical fields formed by the first push alignment electrode 500 and the pixel electrode as well as by the second push alignment electrode 600 and the pixel electrode respectively refer to the two electrodes that form the push electrical filed are located on the same substrate and it is not intended to define that the two electrodes that form the push electrical filed are in the same plane or on the same layer. Of course, the specific arrangement of electrical fields will slightly differ from each other according to the position of the first push alignment electrode 500 or the second push alignment electrode 600. However, this will have no influence on the realization of the push electrical field according to the invention, therefore, the term "transverse push electrical field" is collectively used in the invention. The same also applies to the following embodiments.

The above description of the transverse push electrical fields E1, E2 and the oblique pull electrical field E3 in combination with FIGS. 4, 7 and 10 was made in the situation where the pixel electrode 300 has a positive polarity, and the above description also applies to the situation where the pixel electrode 300 has a negative polarity. The tilting direction of liquid crystal molecules after the liquid crystal display panel is powered is irrelevant to the direction of electrical field and is only related to the arrangement (including the shape and density) of electrical field lines and the like. The longer axes of liquid crystal molecules tend to be arranged in perpendicular to the direction of electrical field lines after the liquid crystal display panel is powered. Therefore, although the direction of electrical field is changed when the pixel electrode 300 has a negative polarity, transverse push electrical fields are still formed between the first push alignment electrode 500 and the pixel electrode 300 as well as between the second push alignment electrode 600 and the pixel electrode 300 respectively, an oblique pull electrical field is still formed at the pull alignment opening 400, and liquid crystal molecules in the liquid crystal display panel will still tilt in a direction as shown in FIGS. 4, 7 and 10 when powered. For a pixel electrode 300 having a positive polarity, the oblique pull electrical field E3 formed at the pull alignment opening 400 diverges from the pull alignment opening 400; for a pixel electrode 300 having a negative polarity, the oblique pull electrical field E3 formed at the pull alignment opening 400 converges towards the pull alignment opening 400.

By employing a structure of the first push alignment electrode 500, the second push alignment electrode 600 and the pull alignment opening 400 in the pixel region of the thin film transistor array substrate 900 according to the first embodiment, transverse push electrical fields E1, E2 and an oblique pull electrical field E3 are formed when the thin film transistor array substrate 900 is in operation, making liquid crystal molecules in the liquid crystal display panel tilt rapidly towards a predetermined direction when powered and thereby improving the responding speed of liquid crystal molecules. Besides, when the liquid crystal display panel is in a dark state, the voltage difference between the pixel electrode 300 and the common electrode 82 is zero, and liquid crystal molecules will still be vertically arranged in a direction perpendicular to the transparent substrate 101. Therefore, the light leak problem with the prior art is prevented and the contrast ratio of the liquid crystal display panel is effectively improved. Thus, while increasing the responding speed of liquid crystal molecules, the liquid crystal display panel according to the invention has a higher contrast ratio.

Figure 12:
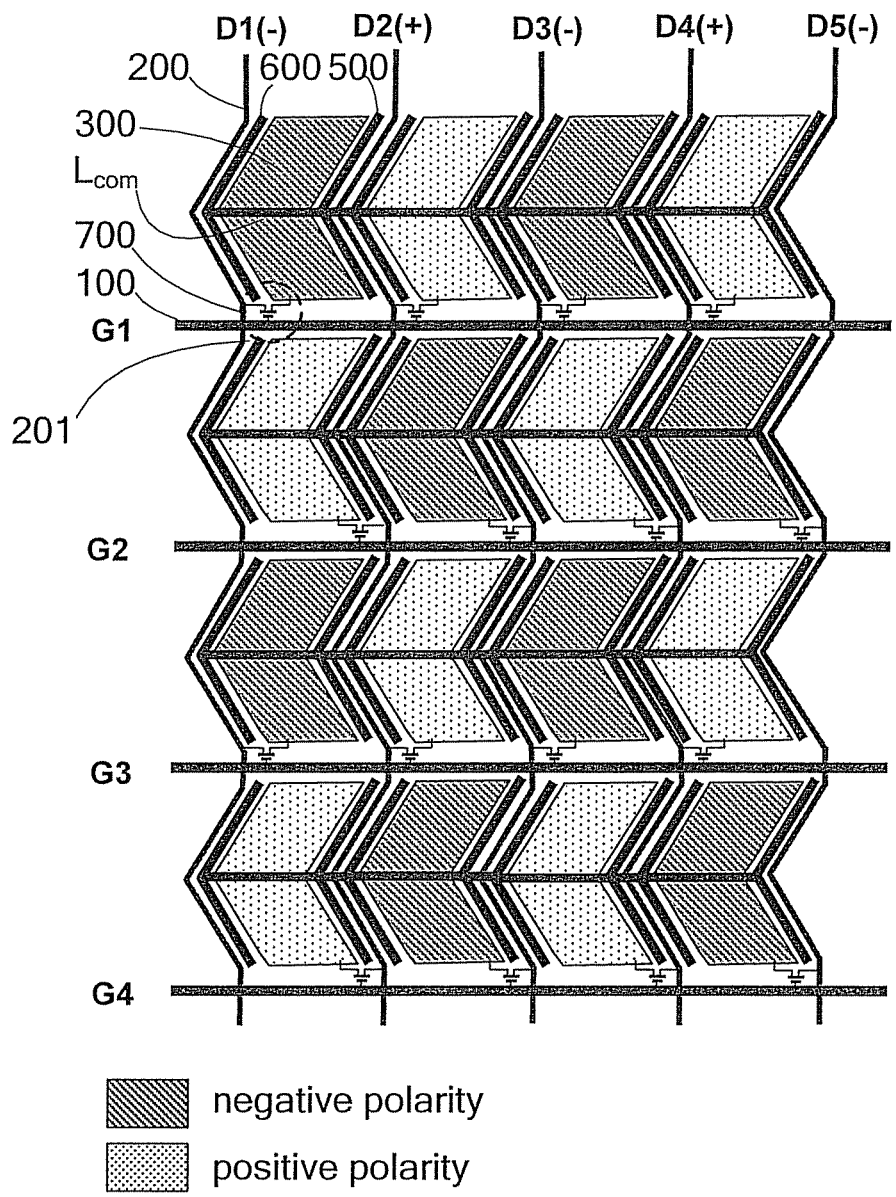
FIG. 12 is a schematic view showing the connecting manner of the pixel structure of a portion of the thin film transistor array substrate according to the first embodiment of the invention.

FIG. 12 is a schematic view showing the connecting manner of the pixel structure of a portion of the thin film transistor array substrate according to the first embodiment of the invention and illustrates the displaying effect of realizing dot inversion through the column inversion driving manner. As shown in FIG. 12, odd data lines D1, D3, D5 . . . connect with the pixel electrodes 300 in the pixel regions 201 of odd rows-odd columns and even rows-even columns, even data lines D2, D4 . . . connect with the pixel electrodes 300 in the pixel regions 201 of odd rows-even columns and even rows-odd columns, and each scanning line 100 connects with the thin film transistors 700 in all the pixel regions 201 of the same row. When the liquid crystal display panel employs a column inversion driving manner, the polarities of adjacent data lines in the same frame are opposite, i.e., the odd data line and the even data line have opposite polarities. In FIG. 12, odd date lines D1, D3 and D5 have negative polarities, and even data lines D2 and D4 have positive polarities. Therefore, the pixel electrodes 300 in the pixel regions 201 of odd rows-odd columns and even rows-even columns that are connected with the odd date lines have opposite polarities to the pixel electrodes 300 in the pixel regions 201 of odd rows-even columns and even rows-odd columns that are connected with the even date lines. In FIG. 12, the pixel electrodes 300 in the pixel regions 201 of odd rows-odd columns and even rows-even columns have negative polarities, and the pixel electrodes 300 in the pixel regions 201 of odd rows-even columns and even rows-odd columns have positive polarities. Therefore, the polarity of the pixel electrode 300 in any pixel region 201 in the same frame is opposite to that of pixel electrodes 300 in adjacent pixel regions 201 from above and below and from left and right. For example, taking the pixel electrode 300 in the pixel region 201 of the second row-second column, which has a negative polarity, as a reference pixel electrode, the pixel electrodes 300 adjacent to the reference pixel electrode 300 from above and below and from left and right are those located respectively at the first row-second column, the third row-the second column, the second row-the first column and the second row-third column, which have positive polarities. In the next frame, the polarities of input voltages from data lines are inverted, i.e., the pixel electrodes 300 of the pixel regions of odd rows-even columns and even rows-odd columns have negative polarities. Also, the polarity of pixel electrode 300 in any pixel region 201 in the same frame is still opposite to that of pixel electrodes 300 in adjacent pixel regions 201 from above and below and from left and right. Therefore, a dot inversion display effect can be realized for liquid crystal display panel, thereby effectively alleviating the image sticking defect of liquid crystal display panel.

The Second Embodiment

Figure 13:
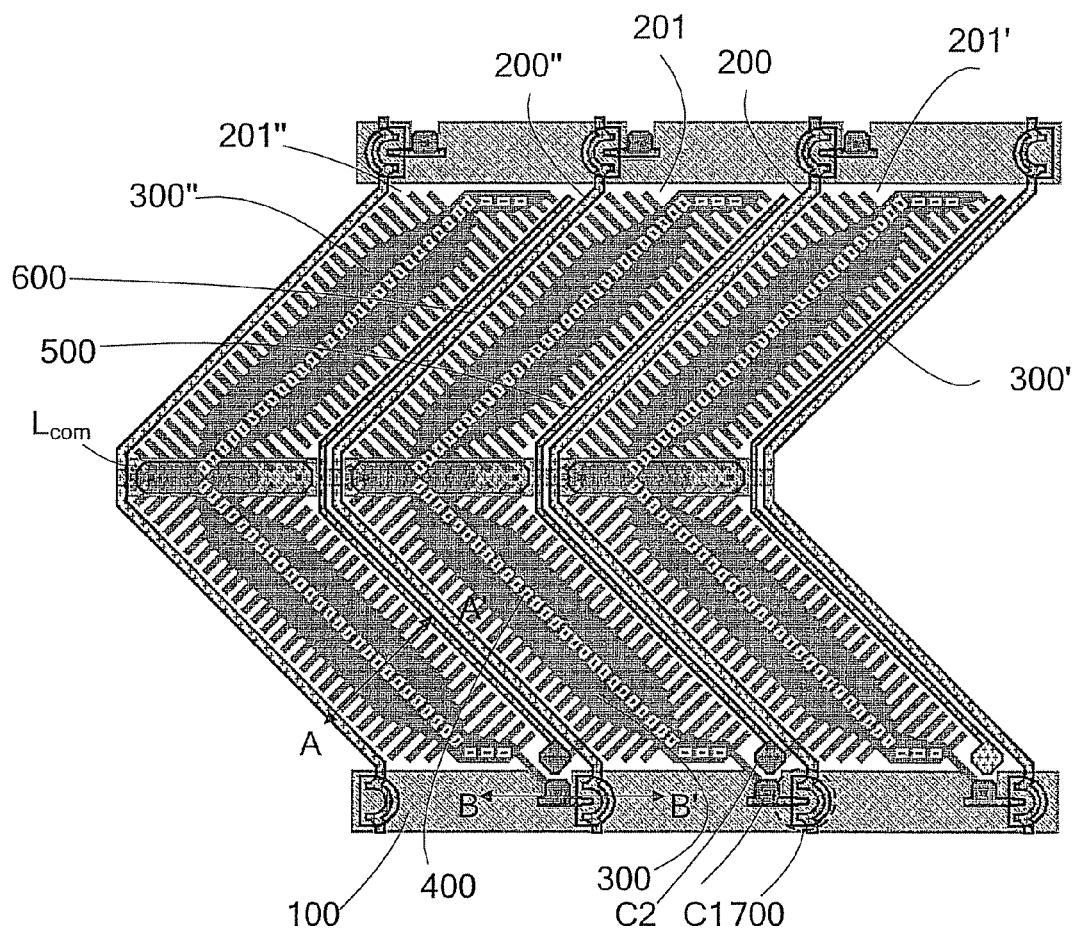
FIG. 13 is a structural plan view of a portion of the liquid crystal display panel according to a second embodiment of the invention.

In the above first embodiment, the first push alignment electrode 500 and a second push alignment electrode 600 are formed by two extending portions of the common electrode line $L_{com}$, while the second embodiment differs from the first embodiment in that, in the second embodiment, the first push alignment electrode in any pixel region is formed by an extending portion of a pixel electrode in an adjacent pixel region that is constituted by a data line that forms the present pixel region and connects with a thin film transistor, and the second push alignment electrode is constituted by the other data line that forms the present pixel region and does not connect with thin film transistors. Description is made below only with respect to the differences and is omitted where the second embodiment is the same as the first embodiment. FIG. 13 is a structural plane view of a portion of the liquid crystal display panel according to the second embodiment. For purpose of clarity, only the thin film transistor array substrate in the liquid crystal display panel is shown and the color filter substrate is omitted. As shown in FIG. 13, in the second embodiment, the thin film transistor array substrate has a common electrode line $L_{com}$ that is parallel with scanning lines 100. For any pixel region 201, the gate electrode of the thin film transistor 700 in the pixel region 201 is electrically connected with the scanning lines 100, the source electrode thereof is electrically connected with the data lines 200, and the drain electrode thereof is electrically connected with the pixel electrode 300 via the through hole C1. The first push alignment electrode 500 in the pixel region 201 is formed by an extending portion of a pixel electrode 300' in an adjacent pixel region 201' that is constituted by a data line 200 that forms the present pixel region 201 and connects with the thin film transistor 700. The second embodiment is illustrated and described by an example in which the first push alignment electrode 500 and the data lines 200 are located on the same layer, i.e., the extending portion of the pixel electrode 300' that constitutes the first push alignment electrode 500 is replaceable by a second metal layer, which is in turn electrically connected with the pixel electrode 300' in the pixel region 201' via a through hole C2. The second push alignment electrode 600 in the pixel region 201 is constituted by a data line 200 that forms the pixel region 201 and does not connect with the thin film transistor 700. The projections of first push alignment electrode 500 and a second push alignment electrode 600 on the transparent substrates 101 are located on two opposite sides of the pixel electrode 30 respectively, and the first push alignment electrode 500 and the second push alignment electrode 600 both extend in a direction along the edge of the pixel electrode 300. Of course, the first push alignment electrode 500 constituted by the extending portion of the pixel electrode 300 may also be located on the same layer as the data line 100, alternatively, be located on the same layer as the pixel electrode 300, or even be formed by a single layer of metal, without departing the essence of the invention.

The thin film transistor array substrate 900 according to the second embodiment of the invention as shown in FIG. 13 may have two different structure manufactured by two different methods due to the different locations where the pixel electrodes are formed. The two situations will be explained in detail below with reference to the drawings.

The First Variation of the Second Embodiment

Figure 14:
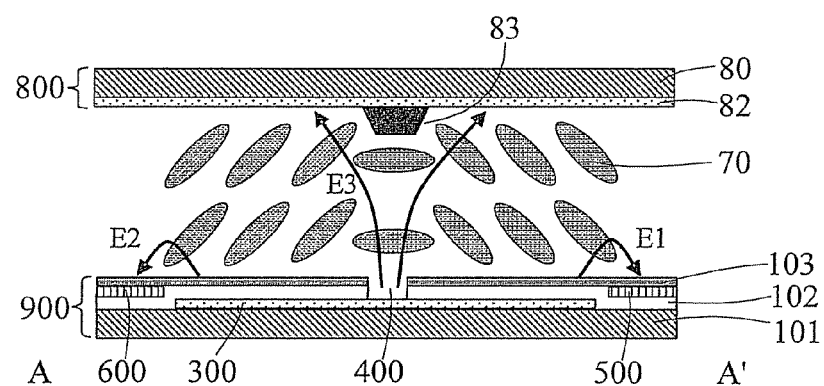
FIG. 14 is a sectional view of the liquid crystal display panel taken along line A-A' in FIG. 13, showing clearly a sectional structure of a thin film transistor array substrate according to a first variation of the second embodiment.

FIG. 14 is a sectional view of the liquid crystal display panel taken along line A-A' in FIG. 13, showing clearly a sectional structure of a thin film transistor array substrate according to a first variation of the second embodiment. As shown in FIG. 14, the first push alignment electrode 500 and the second push alignment electrode 600 are located on the gate electrode insulation layer 102, and the pixel electrode 300 is covered with an insulation layer. In this embodiment, the insulation layer is the gate electrode insulation layer 102 and the passivation layer 103. A pull alignment opening 400 is formed together on the gate electrode insulation layer 102 and the passivation layer 103 for exposing a portion of the pixel electrode 300. Preferably, a plurality of pull alignment openings 400 are formed together on the gate electrode insulation layer 102 and the passivation layer 103. The plurality of pull alignment openings 400 are arranged in a bar shape and the projections thereof on the transparent substrate 101 are located at the central position of the pixel electrode 300 so as to expose the central position of the pixel electrode 300. Besides, the bar shape formed by the plurality of pull alignment openings 400 is parallel with the first push alignment electrode 500 and the second push alignment electrode 600.

The method of manufacturing the thin film transistor array substrate according to the first variation of the second embodiment as shown in FIG. 14 may be similar to that of manufacturing the thin film transistor array substrate according to the second variation of the first embodiment as shown in FIG. 7, with the exception that the first push alignment electrode 500 and the second push alignment electrode 600 are formed simultaneously with the data lines 200 by patterning the second metal layer.

The Second Variation of the Second Embodiment

Figure 15:
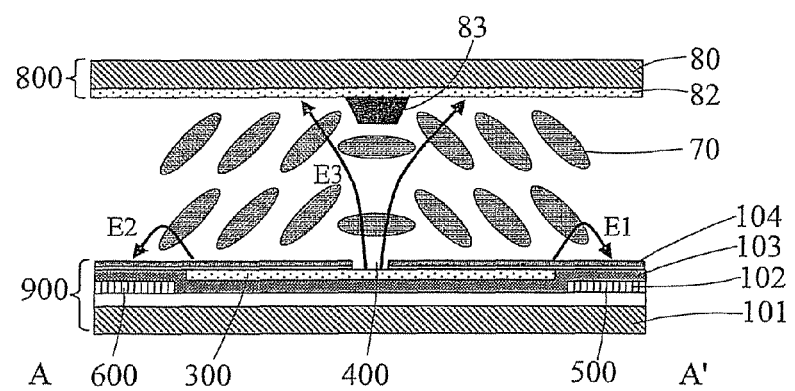
FIG. 15 is a sectional view of the liquid crystal display panel taken along line A-A' in FIG. 13, showing clearly a sectional structure of a thin film transistor array substrate according to a second variation of the second embodiment.

FIG. 15 is a sectional view of the liquid crystal display panel taken along line A-A' in FIG. 13, showing clearly a sectional structure of a thin film transistor array substrate according to a second variation of the second embodiment. As shown in FIG. 15, the first push alignment electrode 500 and the second push alignment electrode 600 are located on the gate electrode insulation layer 102, and the pixel electrode 300 is covered with an insulation layer. In this embodiment, the insulation layer is the passivation layer 104. The passivation layer 103 and the gate electrode insulation layer 102 are sequentially provided under the layer on which the pixel electrode 103 is located. A pull alignment opening 400 is formed on the passivation layer 104 for exposing a portion of the pixel electrode 300. Preferably, a plurality of pull alignment openings 400 are formed on the passivation layer 104. The plurality of pull alignment openings 400 are arranged in a bar shape and the projections thereof on the transparent substrate 101 are located at the central position of the pixel electrode 300 so as to expose the central position of the pixel electrode 300. Besides, the bar shape formed by the plurality of pull alignment openings 400 is parallel with the first push alignment electrode 500 and the second push alignment electrode 600.

The method of manufacturing the thin film transistor array substrate according to the second variation of the second embodiment as shown in FIG. 15 may be similar to that of manufacturing the thin film transistor array substrate according to the third variation of the first embodiment as shown in FIG. 10, with the exception that the first push alignment electrode 500 and the second push alignment electrode 600 are formed together with the data lines 200 by patterning the second metal layer.

For the thin film transistor array substrate in the second embodiment, a connecting manner for pixel structure similar to that of the first embodiment as shown in FIG. 12 can be adopted. The odd data lines 200 connect with the pixel electrodes 300 in the pixel regions of odd rows-odd columns and even rows-even columns, the even data lines 200 connect with the pixel electrodes 300 in the pixel regions of odd rows-even columns and even rows-odd columns, and each scanning line connects with the thin film transistors 700 in all the pixel regions in the same row. Besides, when the liquid crystal panel adopts the column inversion driving manner, the dot inversion display effect can also be realized.

In the second embodiment (including the first and second variations of the second embodiment), when the liquid crystal display panel is in operation in a driving manner of column inverting, the directions indicated by the arrows in FIGS. 14 and 15 are substantially the electrical field directions in the pixel region of the liquid crystal display panel when powered. The electrical field directions in FIGS. 14 and 15 are shown by an example in which the pixel electrode 300 has a positive polarity, i.e., the voltage across the pixel electrode 300 is larger than that across the common electrode 82 on the color filter substrate 800. With additional reference to FIG. 13, since the first push alignment electrode 500 in any pixel region 201 is formed by an extending portion of a pixel electrode 300' in an adjacent pixel region 201' that is constituted by a data line that forms the present pixel region 201 and connects with the thin film transistors 700, the voltage across the first push alignment electrode 500 in the pixel region 201 is equal to that across the pixel electrode 300' in the adjacent pixel region 201'. Since the second push alignment electrode 600 in the pixel region 201 is constituted by a data line 200" that forms the present pixel region 201 and does not connect with the thin film transistor, and the data line 200" connects with a pixel electrode 300" in an adjacent pixel region 201' constituted by the data line 200", the polarity of voltage across the second push alignment electrode 600 in the pixel region 201 is the same as the polarity of voltage across the pixel electrode 300" in the adjacent pixel region 201". Besides, since the dot inversion display effect for liquid crystal display panel can be realized through a column inversion driving manner and the polarity of the pixel electrode in any pixel region is opposite to that of pixel electrodes in adjacent pixel regions from above and below and from left and right, the polarity of voltage across the pixel electrode 300 in the pixel region 201 is opposite to the polarities of voltages across the pixel electrodes 300', 300" in the adjacent pixel regions 201', 201" respectively, and the polarities of voltages across the pixel electrodes 300', 300" in the adjacent pixel regions 201', 201" are the same. Therefore, the polarities of voltages across the first push alignment electrode 500 and the second push alignment electrode 600 in the same pixel region 201 are both opposite to the polarity of voltage across the pixel electrode 300 thereof. Thus, there is a voltage difference between the first push alignment electrode 500 and the pixel electrode 300, as well as the second push alignment electrode 600 and the pixel electrode 300 in the same pixel region 201 respectively. As shown in FIGS. 14 and 15, when the thin film transistor array substrate is in operation, since there is a voltage difference between the first push alignment electrode 500 and the pixel electrode 300 as well as between the second push alignment electrode 600 and the pixel electrode 300 respectively, the first push alignment electrode 500 and the second push alignment electrode 600 on two sides of the pixel electrode 300 form transverse push electrical fields E1, E2 with the pixel electrode 300 respectively, and the longer axes of liquid crystal molecules in the liquid crystal display panel tend to be arranged in perpendicular to electric lines when powered. Therefore, under the action of the transverse push electrical fields E1, E2, liquid crystal molecules in the liquid crystal layer 70 on two sides of the pixel electrode 30 will tilt by a certain angle under the action of the push electric fields in the direction from the edge of pixel region to the interior of pixel region. It equals to that liquid crystal molecules on the left side of the first push alignment electrode 500 are under the push action of the first push alignment electrode 500, and liquid crystal molecules on the right side of the second push alignment electrode 600 are under the push action of the second push alignment electrode 600. Meanwhile, when the thin film transistor array substrate 900 is in operation, since there is a voltage difference between the pixel electrode 300 and the common electrode 82, an electrical field is formed between the pixel electrode 300 and the common electrode 82. Due to the existence of the pull alignment opening 400, the electric lines of the electrical field formed between the pixel electrode 300 and the common electrode 82 will incline towards two opposite sides from the pull alignment opening 400 respectively. Therefore, an oblique pull electrical field E3 is formed at the pull alignment opening 400, under the action of which liquid crystal molecules on the left and right sides of the pull alignment opening 400 will tilt by a certain angle. It equals to that crystal molecules on the left and right sides of the pull alignment opening 400 are under the pull action of the pull alignment opening 400, and the transverse push electrical fields E1, E2 and the oblique pull electrical field E3 cause crystal molecules to till towards the same direction. Under double actions of the transverse push electrical fields E1, E2 and the oblique pull electrical field E3, liquid crystal molecules are tilted by a certain angle in a predetermined direction. Therefore, the responding speed of liquid crystal molecules can be increased and the responding speed of liquid crystal display panel can be thereby increased. In addition, the plurality of pull alignment openings 400 in the embodiment are arranged in a bar shape and the projections thereof on the transparent substrate 101 are located at the central position of the pixel electrode 300. Besides, the bar shape formed by the plurality of pull alignment openings 400 is parallel with the first push alignment electrode 500 and the second push alignment electrode 600. Therefore, when the thin film transistor array substrate 900 is in operation, the pull electrical fields on the left and right sides of the pull alignment opening 400 in the pixel region can be evenly symmetrical with each other, making the crystal molecules on the left and right sides of the pull alignment opening 400 under pull actions of the pull alignment opening 400 that are symmetrical with each other in a left-to-right direction and viewing angles for displaying images of the entire liquid crystal display symmetrical with each other in a left-to-right direction.

For the pixel electrode 300 having a negative polarity, transverse push electrical fields E1, E2 and an oblique pull electrical field E3 can be similarly formed. Therefore, the description with respect to the pixel electrode 300 having a negative polarity is omitted.

For the above-described various embodiment, since a pull alignment opening 400 is formed at the pixel region 201, when the thin film transistor array substrate is in operation, an oblique pull electrical field E3 is formed at the pull alignment opening 400, the electrical field lines of which will incline towards two opposite sides from the pull alignment opening 400 respectively. Therefore, liquid crystal molecules right above the pull alignment opening 400 will under the actions of two symmetrical inclined electrical field lines, making the tilting direction of liquid crystal molecules at this location not determined and resulting in a discontinuity in turning of liquid crystal molecules. Therefore, a disclination line phenomenon will occur on the pixel region at a location corresponding to the pull alignment opening 400 when the liquid crystal display panel is in operation so that the image quality of the liquid crystal display panel is affected. Thus, preferably, a black matrix protrusion 83 that projects into the liquid crystal layer 70 is provided on the color filter substrate 800 at a location corresponding to the pull alignment opening 400 on the thin film transistor array substrate 900. The black matrix protrusion 83 has three functions: i) blocking a disclination line phenomenon at a location corresponding to the pull alignment opening 400, thereby improving image quality of liquid crystal display panel; ii) acting as a bump so that liquid crystal molecules on two sides thereof can have a pretilt angle when the liquid crystal display panel is not powered, thus liquid crystal molecules will tilt more rapidly towards a predetermined direction when the liquid crystal display panel is powered; and iii) changing the distribution of electrical field lines above the pull alignment opening 400 when the liquid crystal display panel is in operation so as to expand the electrical field lines outwardly to further enhance the pull action on liquid crystal molecules near the pull alignment opening 400 so that the liquid crystal molecules will tilt more rapidly. By using the black matrix protrusion 83 of the color filter substrate 800 and the first push alignment electrode 500, the second push alignment electrode 600 and the pull alignment opening 400 on the thin film transistor array substrate, liquid crystal molecules will have a predetermined tilt angle when the liquid crystal display panel is not powered, and will tilt more rapidly towards a predetermined direction when the liquid crystal display panel is powered, since the liquid crystal molecules are under the push actions of the first push alignment electrode 500 and the second push alignment electrode 600 and the pull actions of the pull alignment opening 400 and the black matrix protrusion 83 simultaneously. Therefore, the responding speed of liquid crystal molecules is increased, the disclination line phenomenon is eliminated and the transmittance ratio is improved.

Since the liquid crystal molecules in the liquid crystal layer 70 is under the actions of the oblique pull electrical field E3 and transverse push electrical fields E1 and E2, the liquid crystal molecules will respond quickly, thereby considerably improving the responding speed of liquid crystal display panel. Besides, since the black matrix protrusion 83 itself is an opaque material, even if liquid crystal molecules on two sides of the black matrix protrusion 83 have a predetermined tilt angle when the liquid crystal display panel is not powered, and light leakage phenomenon can be considerably reduced when the liquid crystal display panel is dark as compared to the prior art. The black matrix protrusion 83 is of an isosceles trapezoid shape, preferably, the vertex angle of the trapezoid is in the range from 20 degrees to 60 degrees. Besides, the smaller the vertex angle of the black matrix protrusion 83 is, the higher the contrast ratio of the liquid crystal display panel will be.

Figure 16:
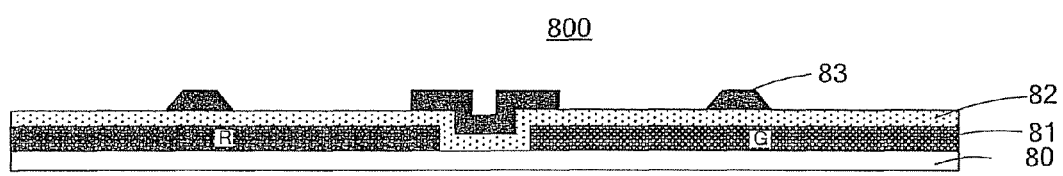
FIG. 16 is a sectional view of a color filter substrate according to a preferred embodiment of the invention.

FIG. 16 is a sectional view of a preferred color filter substrate in the liquid crystal display panel of the invention. As shown in FIG. 16, the method of manufacturing the preferred color filter substrate of the invention still employs five masking processes: forming patterned red (R), green (G) and blue (B) color filter layers 81 on a transparent substrate 80 sequentially; forming a common electrode layer on the patterned color filter layers 81 and a portion of the transparent substrate 80 to form a common electrode 82; forming a patterned black matrix layer on the common electrode 82, a first portion of the patterned black matrix layer being located at the border area of the red (R), green (G) and blue (B) color filter layers 81, and a second portion thereof forming a black matrix protrusion 83 at a location corresponding to the pull alignment opening 400 on the thin film transistor array substrate 900; then forming a photo space (PS) structure (not shown) on a first portion of the patterned black matrix layer. By employing this manufacturing method, the black matrix protrusion 83 that can act as a bump structure can be formed by five masking processes, without the need to add one masking process to additionally form a bump structure in the prior art.

For the above described various embodiments, as shown in FIGS. 3 and 13, preferably, the pixel electrode 300 is of a fishbone shape, which enables liquid crystal molecules near the fishbone to respond rapidly under the action of electrical field at the fishbone. Additionally, preferably, the pixel electrode 300 in each pixel region is substantially of an inverted V shape or zigzag shape so as to form a plurality of tiny areas in each pixel region and to eliminate the disclination line phenomenon at the tiny areas so that a higher transmittance ratio is achieved. Preferably, in order to increase storage capacitance in the pixel region, a portion of second metal layer can be provided between the common electrode line $L_{com}$ and the pixel electrode 300, the portion of second metal layer being electrically connected with the pixel electrode 300 through a through aperture (not shown).

Though simulated experiments, the result shows that by using the liquid crystal display panel of thin film transistor array substrate 900 according to various embodiments of the invention, the responding time can reach approximately 6 ms when feed forward drive is adopted, the responding time is smaller than 17 ms when non feed forward drive is adopted, the contrast ratio is bigger than 5000:1, and the performance is superior to that of conventional MVA liquid crystal display. In addition, through simulation, it shows that by reducing the inclination angle of black matrix protrusion on the color filter substrate and increasing the depth of insulation layer covering the pixel electrode, the invention is advantageous in improving contrast ratio.

Described above are only preferred embodiments of the invention and the invention is not limited thereto. Particular examples are used in the context to explain the principle and embodiments of the invention. The above description of embodiments are intended only to help understand the method and kernel of the invention; meanwhile, for those with ordinary skills in the art, the particular embodiments and the applicable scope can be modified based on the ideas of the invention. In summary, the content of the description should not be construed as limiting the invention.

What is claimed is:

1. A thin film transistor array substrate, comprising:
a transparent substrate, and
a plurality of scanning lines, a plurality of data lines and a plurality of pixel regions that are formed on the transparent substrate,
wherein each pixel region is formed by two adjacent scanning lines and two adjacent data lines that intersect with each other, and comprises a pixel electrode and a thin film transistor for controlling the pixel electrode, the pixel electrode is covered with an insulation layer which is provided with a pull alignment opening, and each pixel region further comprises a first push alignment electrode and a second push alignment electrode, and
wherein projections of the first and the second push alignment electrodes on the transparent substrate are respectively located at two opposite sides of the pixel electrode, and when the thin film transistor array substrate is in operation, an oblique pull electric field is formed at the pull alignment opening, and transverse push electric fields are formed between the first push alignment electrode and the pixel electrode as well as between the second push alignment electrode and the pixel electrode, respectively; and
wherein the insulation layer is provided with a plurality of pull alignment openings, and the plurality of pull alignment openings are arranged in a bar shape and the projections thereof on the transparent substrate are approximately located at a central position of the pixel electrode.

2. The thin film transistor array substrate according to claim 1, wherein the insulation layer is a gate electrode insulation layer and a passivation layer; or the insulation layer is a passivation layer.

3. The thin film transistor array substrate according to claim 1, wherein the first push alignment electrode and the second push alignment electrode in any pixel region are formed by two extending portions of the common electrode line in the pixel region.

4. The thin film transistor array substrate according to claim 1, wherein the first push alignment electrode in any pixel region is formed by an extending portion of a pixel electrode in an adjacent pixel region that is constituted by a data line that forms the present pixel region and connects with the thin film transistor, and the second push alignment electrode is constituted by the other data line that forms the present pixel region and does not connect with the thin film transistor.

5. The thin film transistor array substrate according to claim 4, wherein the first push alignment electrode and the data line are located on the same layer; or the first push alignment electrode and the scanning line are located on the same layer; or the first push alignment electrode and the pixel electrode are located on the same layer.

6. The thin film transistor array substrate according to claim 1, wherein the pixel electrode is in a fishbone shape.

7. The thin film transistor array substrate according to claim 1, wherein the pixel electrode is in an inverted V shape or zigzag shape.

8. The thin film transistor array substrate according to claim 1, wherein odd data lines connect with the pixel electrodes in the pixel regions of odd rows-odd columns and even rows-even columns, even data lines connect with the pixel electrodes in the pixel regions of odd rows-even columns and even rows-odd columns, and each scanning line connects with the thin film transistors in all the pixel regions in the same row.

9. A liquid crystal display device, comprising a liquid crystal display panel and a driving circuit connected with the liquid crystal display panel, wherein the liquid crystal display panel comprises a thin film transistor array substrate according to claim 1, a color filter substrate having a common electrode and a liquid crystal layer sandwiched between the two substrates; and
    wherein the insulation layer is provided with a plurality of pull alignment openings, and the plurality of pull alignment openings are arranged in a bar shape and the projections thereof on the transparent substrate are approximately located at a central position of the pixel electrode.

10. The thin film transistor array substrate according to claim 9, wherein the insulation layer is a gate electrode insulation layer and a passivation layer; or the insulation layer is a passivation layer.

11. The thin film transistor array substrate according to claim 9, wherein the first push alignment electrode and the second push alignment electrode in any pixel region are formed by two extending portions of the common electrode line in the pixel region.

12. The liquid crystal display device according to claim 9, wherein a black matrix protrusion that protrudes into the liquid crystal layer is provided on the color filter substrate at a location corresponding to the pull alignment opening on the thin film transistor array substrate.

13. The liquid crystal display device according to claim 12, wherein the black matrix protrusion is in an isosceles trapezoid shape, and the vertex angle of the trapezoid is in the range from 20 degrees to 60 degrees.

14. The liquid crystal display device according to claim 12, wherein a color filter layer, a common electrode layer and a black matrix layer are sequentially formed on the color filter substrate.

15. The liquid crystal display device according to claim 9, wherein the liquid crystal display panel employs a column inversion driving manner, and in the same frame, the pixel electrodes in the pixel regions of odd rows-odd columns and even rows-even columns have opposite polarities to the pixel electrodes in the pixel regions of odd rows-even columns and even rows-odd columns.

16. A method of manufacturing a thin film transistor array substrate, comprising:
    forming a first metal layer on a transparent substrate and patterning the first metal layer so as to form gate electrodes of thin film transistors, scanning lines, main body portions of common electrode lines and first push alignment electrodes and second push alignment electrodes constituted by two extending portions of the common electrode lines;
    forming a transparent conductive material layer and patterning the transparent conductive material layer so as to form pixel electrodes;
    forming a gate electrode insulation layer and patterning the gate electrode insulation layer so as to form first portions of pull alignment openings on the gate electrode insulation layer covering the pixel electrodes so that portions of the pixel electrodes are exposed, and to form through holes in the pixel regions and through apertures in the non-display area;
    forming an amorphous silicon layer and a doped amorphous silicon layer sequentially, and patterning the amorphous silicon layer and the doped amorphous silicon layer so as to form semiconductor layers of the thin film transistors;
    forming a second metal layer and patterning the second metal layer so as to form source electrodes and drain electrodes of the thin film transistors and data lines, the drain electrode of the thin film transistor being electrically connected with the corresponding pixel electrode via the above through hole; and
    depositing a passivation layer and patterning the passivation layer so as to form second portions of the pull alignment openings at locations corresponding to the first portions of the pull alignment openings on the passivation layer covering the pixel electrodes so that portions of the pixel electrodes are exposed.

* * * * *